(12) United States Patent
Barth et al.

(10) Patent No.: US 11,140,064 B2
(45) Date of Patent: *Oct. 5, 2021

(54) CONFIGURING A TOPOLOGY OF DEVICES TO SUPPORT SCALING OF AN EXCHANGE POINT

(71) Applicant: Juniper Networks, Inc., Sunnyvale, CA (US)

(72) Inventors: Jonathan C. Barth, Collegeville, PA (US); Xiaomin Wu, Herndon, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,224

(22) Filed: Oct. 16, 2019

(65) Prior Publication Data

US 2020/0052998 A1 Feb. 13, 2020

Related U.S. Application Data

(63) Continuation of application No. 15/925,474, filed on Mar. 19, 2018, now Pat. No. 10,476,779.

(51) Int. Cl.
*H04L 12/751* (2013.01)
*H04L 12/715* (2013.01)
(Continued)

(52) U.S. Cl.
CPC .............. *H04L 45/02* (2013.01); *H04L 45/04* (2013.01); *H04L 45/22* (2013.01); *H04L 45/50* (2013.01); *H04L 67/28* (2013.01)

(58) Field of Classification Search
CPC ......... H04L 45/02; H04L 45/04; H04L 67/34; H04L 67/28; H04L 67/2814;
(Continued)

(56) References Cited

U.S. PATENT DOCUMENTS 7,023,808 B2* 4/2006 Ball .................... H04L 45/56
370/238
8,320,361 B2* 11/2012 Mohapatra ............. H04L 45/28
370/351
(Continued)

OTHER PUBLICATIONS

Bates T., et al., "BGP Route Reflection: An Alternative to Full Mesh Internal BGP (IBGP)," Network Working Group, RFC 4456, Apr. 2006, 12 pages.
(Continued)

*Primary Examiner* — Man U Phan
(74) *Attorney, Agent, or Firm* — Harrity & Harrity, LLP

(57) ABSTRACT

A network device may receive, from client devices, route information for one or more sets of routes. The network device may provide, based on receiving the route information, a request for route distribution instructions, which may cause a server device to provide the network device with the route distribution instructions. The network device may process the route distribution instructions to identify the one or more subsets of the route information that are to be distributed amongst network devices that are configured with route reflection capabilities. The network device may provide, using route reflection capabilities, the one or more subsets of the route information to the network devices based on the route distribution instructions. The network devices may use the one or more subsets of the route information and route copy instructions to generate route copy information for the one or more subsets of route information.

20 Claims, 6 Drawing Sheets

(51) Int. Cl.
*H04L 29/08* (2006.01)
*H04L 12/723* (2013.01)
*H04L 12/707* (2013.01)

(58) Field of Classification Search
CPC ..... H04L 45/221; H04L 45/50; H04L 12/751;
H04L 12/707; H04L 29/08; H04L 12/723;
H04L 12/715
USPC ........................................................ 370/392
See application file for complete search history.

(56) References Cited

U.S. PATENT DOCUMENTS

| | | | | |
|---|---|---|---|---|
| 8,549,616 B2* | 10/2013 | Gerber | .................... | H04L 45/04 |
| | | | | 726/15 |
| 10,015,073 B2* | 7/2018 | Patel | ....................... | H04L 45/48 |
| 10,069,716 B2* | 9/2018 | Yadlapalli | ............... | H04L 45/02 |
| 10,084,685 B2* | 9/2018 | Tomotaki | ................ | H04L 45/06 |
| 10,097,449 B2* | 10/2018 | Patel | ....................... | H04L 45/12 |
| 2005/0074003 A1* | 4/2005 | Ball | ........................ | H04L 45/04 |
| | | | | 370/389 |
| 2006/0029035 A1* | 2/2006 | Chase | .................... | H04L 45/02 |
| | | | | 370/351 |
| 2006/0083215 A1* | 4/2006 | Uttaro | ................. | H04L 12/4645 |
| | | | | 370/351 |
| 2007/0097974 A1* | 5/2007 | Ward | ..................... | H04L 45/46 |
| | | | | 370/392 |
| 2018/0041419 A1* | 2/2018 | Burgio | ................... | H04L 12/46 |

OTHER PUBLICATIONS

Co-pending U.S. Appl. No. 15/925,474, filed Mar. 19, 2018.
Rekhter Y., et al., "A Border Gateway Protocol 4 (BGP-4)," Network Working Group, RFC 1771, Mar. 1995, 57 pages.

* cited by examiner

CONFIGURING A TOPOLOGY OF DEVICES TO SUPPORT SCALING OF AN EXCHANGE POINT

RELATED APPLICATION

This application is a continuation of U.S. patent application Ser. No. 15/925,474 (now U.S. Pat. No. 10,476,779), filed Mar. 19, 2018, the content of which is incorporated herein by reference in its entirety.

BACKGROUND

A network may serve as an intermediary between other networks. For example, an exchange point (XP) may be a physical and/or virtual infrastructure through which clients may exchange traffic between two or more end-point networks. As an example, an internet exchange point (IXP) is a physical and/or virtual infrastructure through which internet service providers (ISPs) and content delivery networks (CDNs) exchange traffic between their networks.

SUMMARY

According to some possible implementations, a server device may include one or more memories and one or more processors. The one or more processors may receive, from a proxy network device, a request for route distribution instructions for one or more sets of routes that are associated with one or more clients. The proxy network device may be included in a network with one or more network devices that are capable of using the one or more sets of routes to route traffic associated with the one or more clients. The one or more processors may determine the route distribution instructions after receiving the request. The route distribution instructions may instruct the proxy network device on how to separate route information for each of the one or more sets of routes into one or more subsets of the route information, and may instruct the proxy network device on how to distribute the one or more subsets of the route information amongst the one or more network devices. The one or more processors may provide the route distribution instructions to the proxy network device to cause the proxy network device to use the route distribution instructions to distribute the one or more subsets of the route information amongst the one or more network devices. The one or more processors may determine, for the one or more subsets of the route information, route copy instructions that indicate a number of copies of the one or more subsets of the route information that each network device is to generate, and that indicate locations of where to store copies of the one or more subsets of the route information. The one or more processors may provide the route copy instructions to the one or more network devices to cause the one or more network devices to generate route copy information for the one or more subsets of the route information, and store the route copy information using one or more data structures.

According to some possible implementations, a network device may include one or more memories and one or more processors. The one or more processors may receive, from one or more client devices, route information for one or more sets of routes associated with one or more clients. The one or more processors may provide, based on receiving the route information, a request for route distribution instructions. The route distribution instructions may include instructions indicating how to separate route information for each of the one or more sets of routes into one or more subsets of the route information and instructions indicating how to distribute the one or more subsets of the route information amongst the one or more network devices. The one or more processors may receive the route distribution instructions after providing the request. The one or more processors may process the route distribution instructions to identify the one or more subsets of the route information that are to be distributed amongst the one or more network devices. The one or more processors may provide, using route reflection capabilities, the one or more subsets of the route information to the one or more network devices based on the route distribution instructions. One or more of the network devices may be configured with route reflection capabilities. The one or more network devices may store the one or more subsets of the route information using one or more client-specific data structures. The one or more network devices may use the one or more subsets of the route information and route copy instructions to generate route copy information for the one or more subsets of the route information. The one or more network devices may store the route copy information using the one or more data structures.

According to some possible implementations, a method may include receiving, by at least one of one or more devices and from one or more client devices, route information for one or more sets of routes associated with one or more clients. At least a portion of the one or more devices may be included in a network with one or more network devices that are capable of using the one or more sets of routes to route traffic. The method may include determining, by at least one of the one or more devices, route distribution instructions for the route information. The route distribution instructions may indicate how to separate route information for each of the one or more sets of routes into one or more subsets of the route information, and may indicate how to distribute the one or more subsets of the route information amongst the one or more network devices. The method may include processing, by at least one of the one or more devices, the route distribution instructions to identify the one or more subsets of the route information that are to be distributed amongst the one or more network devices. The method may include providing, by at least one of the one or more devices and by using route reflection capabilities, the one or more subsets of the route information to the one or more network devices. At least one of the one or more network devices may be configured with route reflection capabilities. Providing the one or more subsets of the route information to the one or more network devices may cause the one or more network devices to store the one or more subsets of the route information using one or more client-specific data structures. The method may include determining, by at least one of the one or more devices, route copy instructions for the one or more subsets of the route information. The route copy instructions may indicate a number of copies of the one or more subsets of the route information that each network device is to generate, and that indicate locations of where to store copies of the one or more subsets of the route information. The method may include providing, by at least one of the one or more devices, the route copy instructions to the one or more network devices to cause the one or more network devices to generate route copy information for the one or more subsets of the route information, and store the route copy information using the one or more client-specific data structures.

DETAILED DESCRIPTION

Figure 1A:
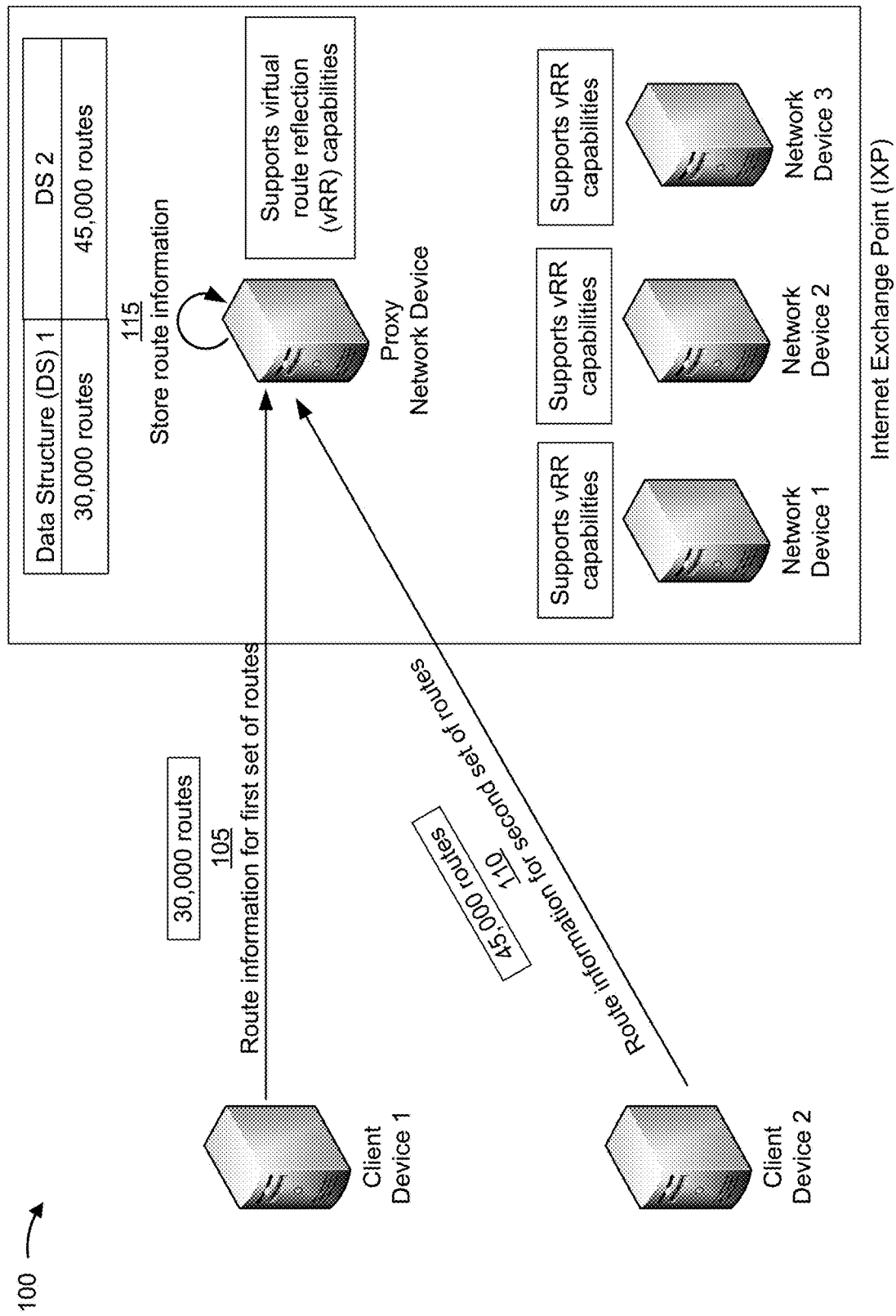
FIGS. 1A-1C are diagrams of an overview of an example implementation described herein.

The following detailed description of example implementations refers to the accompanying drawings. The same reference numbers in different drawings may identify the same or similar elements.

An exchange point (XP), such as an internet exchange point (IXP), may include a topology of network devices that are collectively able to route traffic of particular clients (e.g., an internet service provider (ISP), a content delivery network (CDN), etc.). For example, an XP may include a full-mesh topology of network devices whereby each network device maintains a logical connection with every other network device. In this case, route information for routes used to send a client's traffic must be distributed to all network devices within the XP. However, because the route information needs to be stored by all network devices within the XP, the full-mesh topology may be ineffective if the XP is to scale.

One solution is to implement a topology that uses a central route server (sometimes referred to as a route reflector). In this case, the central route server may support route reflection capabilities that enable the central route server to distribute route information to all other network devices in the topology. In this way, each network device does not need to maintain a logical connection with every other network device.

Additionally, the central route server may need to be configured in a manner that preserves transparency within the XP. Transparency is a concept that is used to describe an XP that is able to provide an assurance to clients that traffic is to be seamlessly routed from client devices to destination devices, using a best-fit route (e.g., a most efficient route, a fastest route, etc.). For example, if a first client and a second client send traffic to a particular destination, the first client and the second client may offer one or more prospective routes to the particular destination to the central route server. In this case, the central route server may perform a best-fit route determination, and may offer the best-fit route to both the first and second clients.

One configuration that preserves transparency within the XP is to have the central route server store route information for each client's prospective routes using different routing tables. As an example, if the XP services ten clients, and each client has a set of routes that may be used to send client-specific traffic to particular destinations, then the central route server, and all other network devices in the XP, may each be configured with ten different routing tables (e.g., one per client). Additionally, in this configuration, the central route server may generate copies of the route information for each client's set of prospective routes, and may store the copies such that each routing table stores every possible route for every client.

However, the topology that uses the central route server may have issues scaling because of the amount of processing resources and/or memory resources that are needed to store and/or distribute the route information to the other network devices in the XP. Furthermore, the topology that uses the central route server may have issues scaling because of the amount of processing resources and/or memory resources that are needed to generate, store, and/or distribute copies of the route information to the other network devices in the XP. Additionally, the topology that uses the central route server may have issues scaling because the amount of time needed to distribute the route information and/or the copies of the route information may delay the central route server from performing best-fit route determinations.

Some implementations described herein provide an architectural approach to improve scalability of an XP. For example, an architecture supporting an XP may include a proxy network device, one or more network devices, and a route management platform. In this case, the proxy network device and at least one of the network devices may be configured with route reflection capabilities.

Additionally, the proxy network device may be configured to receive, from one or more client devices, route information for one or more sets of routes associated with one or more clients. In this case, the proxy network device may be configured to provide a request to the route management platform for route distribution instructions, and may be configured to receive the route distribution instructions from the route management platform. The route distribution instructions may indicate an intelligent way to separate the route information for each set of routes into one or more subsets of the route information. Additionally, the route distribution instructions may indicate an intelligent way to distribute the one or more subsets of the route information amongst the one or more network devices. Furthermore, the proxy network device may be configured to use the route distribution instructions to distribute the one or more subsets of the route information amongst the one or more network devices.

Additionally, the route management platform may be configured with route copy instructions that may be used to create copies of the one or more subsets of the route information. The route copy instructions may include copy instructions indicating a number of times to copy the one or more subsets of the route information, storage instructions indicating locations of where to store the route copies, and/or the like. Furthermore, the route management platform may be configured to provide the route copy instructions to the one or more network devices.

Additionally, the one or more network devices may be configured to store the one or more sets of the route information using one or more data structures (e.g., routing tables, forwarding tables, etc.). For example, the one or more network devices may use client-specific data structures to store the one or more sets of the route information.

Furthermore, the one or more network devices may be configured to use the route copy instructions to generate route copy information for the one or more subsets of the route information. Moreover, the one or more network devices may be configured to store the route copy information using the one or more client-specific data structures. In some cases, the one or more network devices may be configured to store route copy information such that every single client-specific data structure associated with a network device stores either a particular subset of the route information or route copy information for the particular subset of the route information.

In this way, the architectural approach allows the XP to scale to support additional clients and/or additional traffic per client. For example, by distributing route information and route copy information for each set of routes amongst the one or more network devices, each network device avoids having to store all route information and/or all route copy information for all sets of routes. This reduces a utilization of memory resources on each network device, thereby improving scalability and operation of the network devices. Additionally, the architectural approach reduces a utilization of network resources and/or processing resources of the proxy network device by reducing a total amount of route information that the proxy network device distributes amongst the one or more network devices, and by eliminating a need for the proxy network device to distribute route copy instructions entirely (e.g., by use of the route management platform), thereby improving scalability.

Additionally, the architectural approach reduces an amount of time needed to distribute the route information and/or the route copy information, thereby improving scalability by improving a speed at which a device in the XP is able to perform best-fit route determinations. Furthermore, the architectural approach allows the XP to scale while preserving transparency and not violating client-specific routing policies.

Figure 1B:
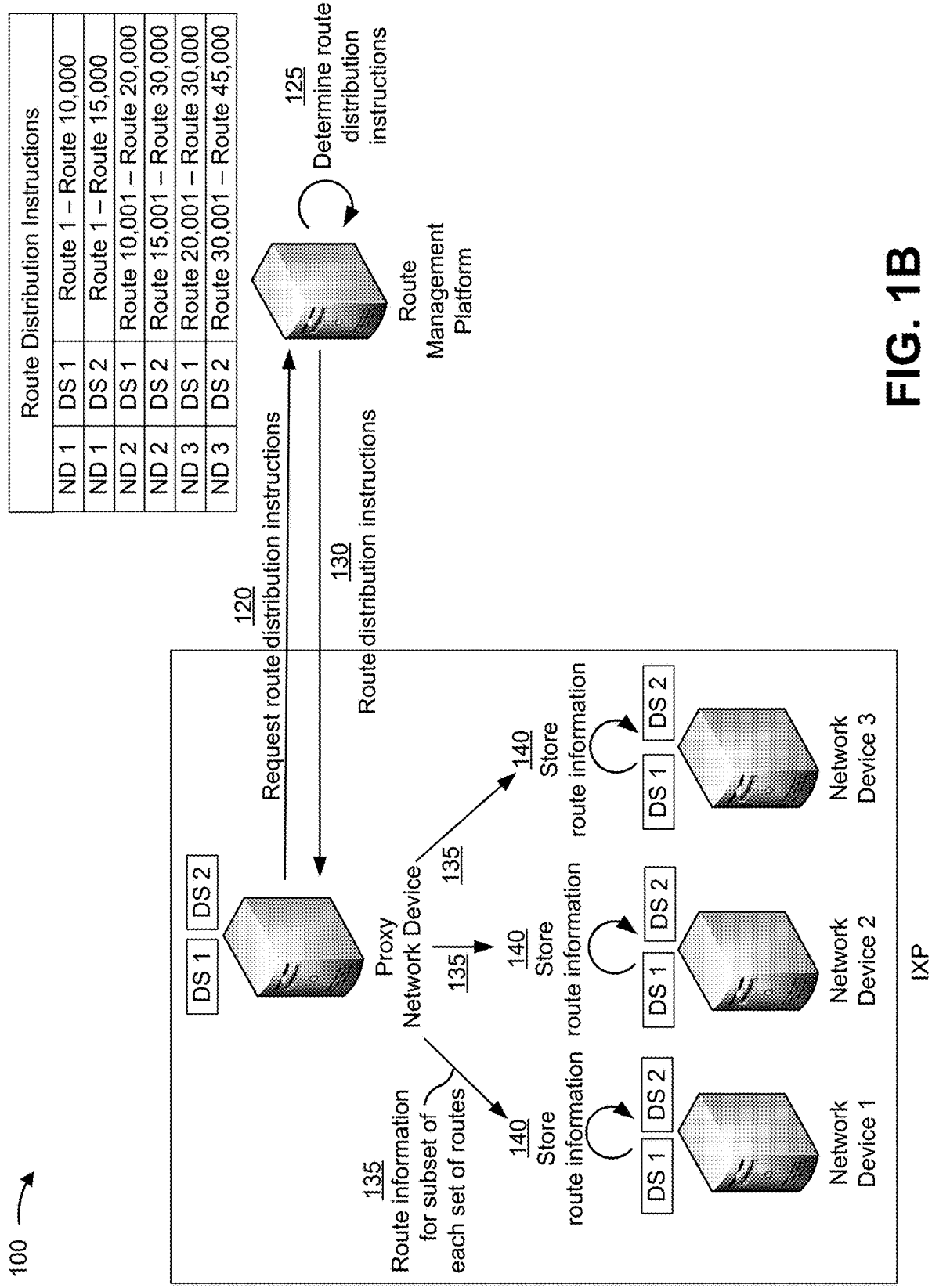
Figure 1C:
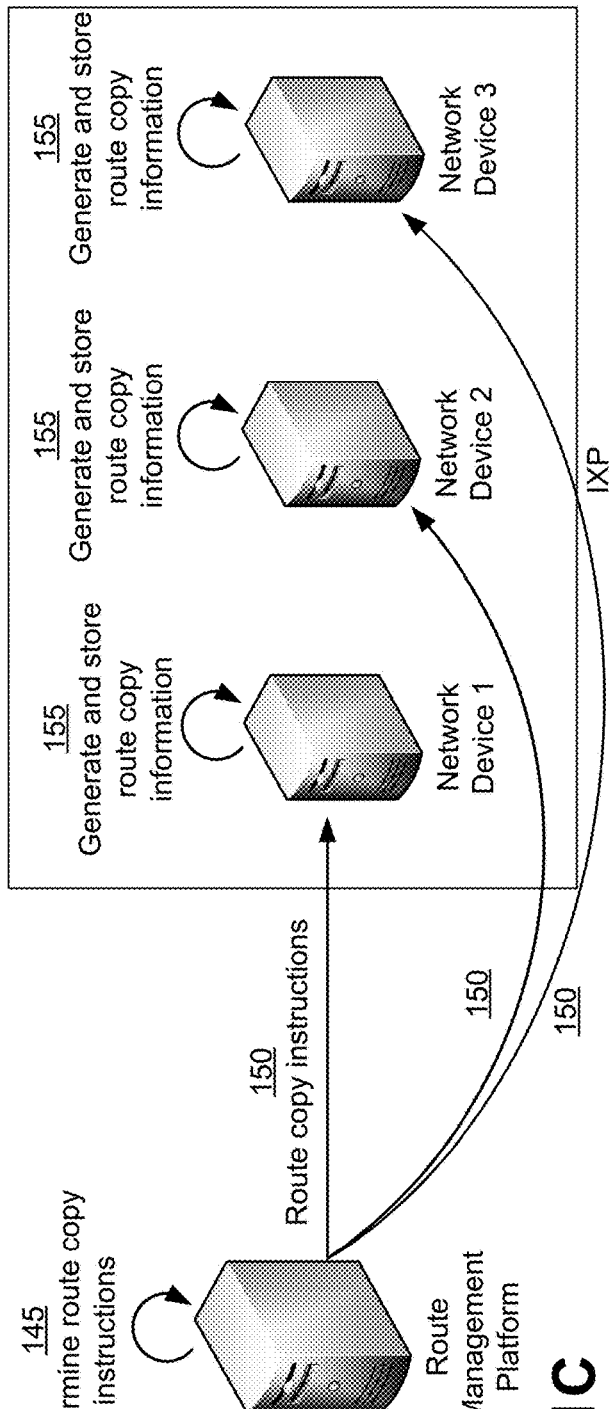

FIGS. 1A-1C are diagrams of an overview of an example implementation 100 described herein. As shown in FIGS. 1A-1C, example implementation 100 shows an internet exchange point (IXP) being used to manage route information for a set of client devices (shown as Client Device 1 and Client Device 2).

The architectural configuration of the IXP may include a set of network devices supporting virtual route reflection capabilities (shown as Network device 1, Network Device 2, and Network Device 3) and a proxy network device that supports virtual route reflection capabilities. The virtual route reflection capabilities may allow a device to distribute route information for the one or more sets of routes amongst other devices in the network. For example, rather than having each client device provide route information to each device in the IXP, each client device may provide route information to a device that supports route reflection capabilities (e.g., the proxy network device, the one or more network devices), and the device that supports the route reflection capabilities may ensure that the route information and/or route copy information is distributed amongst other devices in the network, without requiring the other devices in the network to maintain associations with each other.

As shown in FIG. 1A, and by reference number 105, the proxy network device may receive, from a first client device (shown as Client Device 1), route information for a first set of routes (shown as 30,000 routes). As shown by reference number 110, the proxy network device may receive, from a second client device (shown as Client Device 2), route information for a second set of routes (shown as 45,000 routes). The number of clients serviced by the IXP are provided merely as an example. In practice, the IXP may service hundreds of clients, thousands of clients, tens of thousands of clients, or more, by scaling the number of devices in the IXP that support virtual route reflection.

The route information may include IP address information and/or port information associated with a client device sending traffic, IP address information and/or port information for a device in a same network as the client device (e.g., which may be using the client device to send traffic through the IXP), IP address information and/or port information for a destination device, IP address information and/or port information for one or more intermediary devices between a starting device and the destination device (e.g., often referred to as a next hop), and/or the like.

In some implementations, the proxy network device may receive the route information as part of a route advertisement. For example, the proxy network device may receive route advertisements from the set of client devices using a protocol, such as a border gateway protocol (BGP), a resource reservation protocol (RSVP) traffic engineering (TE) (RSVP-TE) protocol, and/or the like. Additionally, or alternatively, the proxy network device may receive the route information periodically, according to a schedule, based on a request, and/or the like.

As shown by reference number 115, the proxy network device may store route information. For example, the proxy network device may store the route information using a different data structure for each client's set of routes. A data structure may be a routing table, a forwarding table, a virtual routing table, a virtual forwarding table, and/or the like. As shown as an example, the proxy network device may store the route information for the first set of routes using a first data structure (shown as Data Structure (DS) 1) and may store the route information for the second set of routes using a second data structure (shown as DS 2).

In this way, the proxy network device is able to receive route information for routes associated with one or more clients of the IXP. Furthermore, in an architectural configuration that did not utilize the proxy network device, the IXP would be able to manage the route information only by requiring clients to maintain multiple associations with each network device in the IXP. In this way, the architectural configuration of the IXP does not impose an undue burden on clients by allowing each client device to maintain a single association with the IXP (e.g., through the proxy network device). Additionally, this reduces IXP complexity and conserves network resources by reducing a number of associations within the IXP that need to be maintained.

As shown in FIG. 1B, example implementation 100 may further include a route management platform. In this case, the route management platform may make route distribution decisions for the proxy network device, thereby improving scalability of the IXP and conserving processing and memory resources on the proxy network device that would otherwise be used to make the route distribution decisions.

As shown by reference number 120, the route management platform may receive a request for route distribution instructions from the proxy network device. For example, the proxy network device may make an application programming interface (API) call to the route management platform to provide the request. The route distribution instructions may instruct the proxy network device on how to separate route information for each of the one or more sets of routes into one or more subsets of the route information, may instruct the proxy network device on how to distribute the one or more subsets of the route information amongst the one or more network devices, and/or the like.

As shown by reference number 125, the route management platform may determine route distribution instructions. For example, the route management platform may use a set of configurable rules to determine the route distribution instructions. The set of rules may include a first rule indicating an intelligent way to separate the route information for each route, of the one or more sets of routes, into one or more subsets of the route information, a second rule indicating an intelligent way to distribute the one or more subsets of the route information amongst the network devices (e.g., by indicating which data structures to use to store route information for each subset), and/or the like.

In some implementations, the route management platform may determine the route distribution instructions using a rule that indicates to separate the route information for a route into a number of subsets that is equal to a number of network devices within the network (or equal to a number of network devices that support virtual route reflection capabilities).

As shown as an example, assume there are three network devices each supporting virtual route reflection capabilities. Further assume the route management platform is configured with a rule indicating to separate route information for each set of routes into subsets based on a number of network devices in the IXP.

In this example, because there are three network devices in the IXP, the route management platform may separate the route information for the first set of routes into three subsets. For example, the route management platform may separate the route information for the 30,000 routes into a first subset that includes route information for route 1 through route 10,000, a second subset that includes route information for route 10,001 through route 20,000, and a third subset that includes route information for route 20,001 through route 30,000. Similarly, the route management platform may separate the route information for the second set of routes into three subsets, in the same manner described above.

In some implementations, the route management platform may determine how to distribute the one or more subsets of the route information based on a rule. For example, the route management platform may use a rule indicating to distribute the one or more subsets of the route information equally amongst the one or more network devices, a rule indicating load balance distribution of the one or more subsets of the route information based on available capacity of each network device of the one or more network devices, and/or the like.

Continuing with the above example, assume the route management platform is configured with a rule indicating that the one or more subsets of route information for each set of routes are to be stored such that each subset is stored by data structures supported by different network devices. As shown, the route management platform may determine that the first subset of the first set of routes (route 1 through route 10,000) are to be stored using a first data structure (DS1) that is supported by the first network device (ND1), that the second subset of the first set of routes (route 10,001 through route 20,000) are to be stored using a first data structure (DS1) that is supported by the second network device (ND2), and that the third subset of the first set of routes (route 20,001 through route 30,000) are to be stored using a first data structure (DS1) that is supported by the third network device (ND3). As shown, a similar determination may be made for the second set of routes.

As shown by reference number 130, the route management platform may provide the route distribution instructions to the proxy network device. As shown by reference number 135, the proxy network device may use the route distribution instructions to distribute the route information amongst the data structures supported by the one or more network devices. Continuing with the above example, the proxy network device may send a first subset of the route information for the first set of routes to the first data structure of the first network device, a second subset of the route information for first set of routes to the first data structure of the second network device, and a third subset of the route information for first set of routes to the first data structure of the third network device. Additionally, the proxy network device may send route information for the second set of routes in a similar manner.

As shown by reference number 140, each network device in the IXP may store at least one subset of the route information for each set of routes. For example, the network devices may be instructed by the proxy network device to store each subset of route information for each set of routes in particular data structures, in the manner described above.

In this way, the network devices in the IXP are able to store subsets of the route information for each set of routes. Furthermore, by storing subsets of the route information for each set of routes, the architectural configuration of the IXP conserves storage resources relative to a configuration that uses a route server to send route information for all clients for storage by all network devices.

As shown in FIG. 1C, and by reference number 145, the route management platform may determine route copy instructions. For example, the route management platform may determine route copy instructions using one or more configurable rules. The one or more configurable rules may include a rule indicating an intelligent way to determine the number of copies that each network device is to generate, a rule indicating an intelligent way to determine the locations of where to store the copies, and/or the like.

In some implementations, the route management platform may determine the route copy instructions using a rule indicating to generate copies of the one or more subset of the route information that are provided to each network device. In this case, a number of copies generated may be a number that allows every data structure associated with the network device to store either the particular subset of the route information or route copy information for the subset of the route information.

In other cases, the route management platform may be configured with route copy instructions. For example, rather than determine the route copy instructions, the route management platform may be configured with copy instructions indicating a number of times that each network device, of the one or more network devices, is to generate a copy of the one or more subsets of the route information, storage instructions indicating locations of where to store the copies of the one or more subsets of the route information, and/or the like.

As shown by reference number 150, the route management platform may provide the route copy instructions to the network devices of the IXP. For example, the route management platform may provide route copy instructions to allow the network devices to generate and store route copy information for the one or more subsets of the route information. Generating route copy information allows each client-specific data structure to include routes for all clients within the IXP, thereby preserving transparency. Additionally, route copy information improves stability in the IXP (e.g., through redundancies in the storage of the route information).

As shown by reference number 155, the network devices may generate and store route copy information. For example, the network devices may process the route copy instructions which indicate to generate route copy information for each subset of the route information for each set of routes. Additionally, the route copy instructions may indicate which data structure that the network devices are to use to store the route copy information.

Continuing with the previously example, and as shown in FIG. 1C, the first network device may store route copy information for the first subset of the first set of routes using the second data structure (the data structure storing the original route information for the first subset of the second set of routes), and may store route copy information for the first subset of the second set of routes using the first data structure (the data structure storing the original route information for the first subset of the first set of routes). Additionally, the second network device may store route copy information for the second subset of the first set of routes using the second data structure, and may store route copy information for the second subset of the second set of routes using the first data structure. Additionally, the third network device may store route copy information for the third subset of the first set of routes using the second data structure, and may store route copy information for the third subset of the second set of routes using the first data structure.

In this way, the IXP is able to be configured in a manner that allows the IXP to scale to support additional clients and/or additional traffic per client. For example, by distributing route information and route copy information for each set of routes amongst the one or more network devices, rather than distributing route information and/or route copy information for all routes to all network devices, the IXP reduces a utilization of memory resources on each network device, thereby improving scalability. Additionally, the IXP is able to be configured in a manner that reduces a utilization of network resources and/or processing resources of the proxy network device by reducing a total amount of route information that the proxy network device distributes amongst the one or more network devices, and by eliminating a need for the proxy network device to distribute route copy instructions entirely (e.g., by use of the route management platform), thereby improving scalability.

As indicated above, FIGS. 1A-1C are provided merely as an example. Other examples are possible and may differ from what was described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of example implementation 100 may perform one or more functions described as being performed by another set of devices of example implementation 100.

Figure 2:
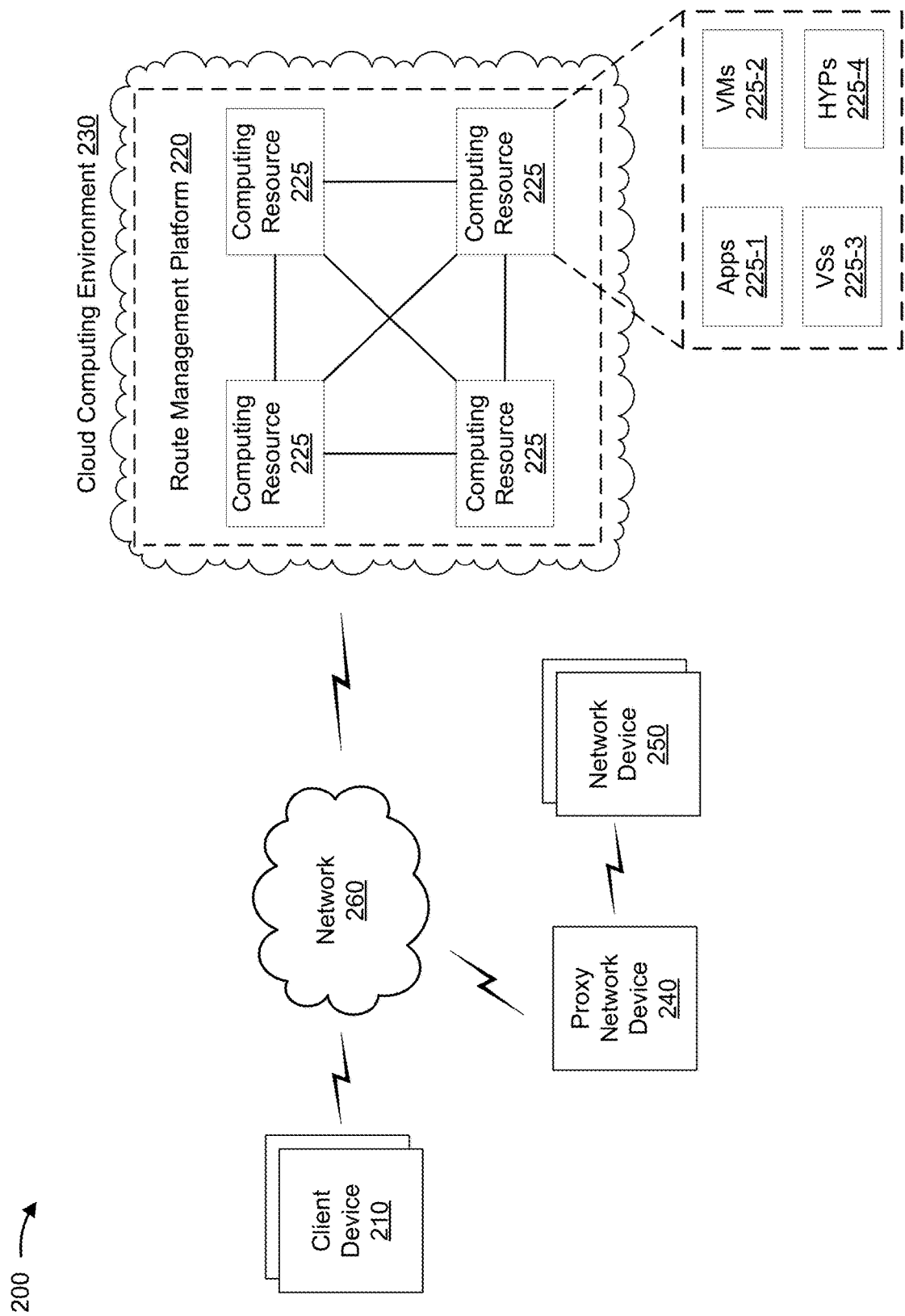
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a route management platform 220 hosted by a cloud computing environment 230, a proxy network device 240, a network device 250, and/or a network 260. Devices of environment 200 may interconnect via wired connections, wireless connections, or a combination of connections.

Client device 210 includes one or more devices capable of receiving, generating, storing, processing, and/or providing route information. For example, client device 210 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may provide route information for a set of routes to proxy network device 240. In some implementations, client device 210 may receive route information for best-fit routes from proxy network device 240.

Route management platform 220 includes one or more devices capable of receiving, storing, generating, processing, and/or providing information associated with one or more sets of routes. For example, route management platform 220 may include a server device (e.g., a host server, a web server, an application server, etc.), a data center device, or a similar device. In some implementations, route management platform 220 may receive a request for route distribution instructions from proxy network device 240 (e.g., via an application programming interface (API)). In some implementations, route management platform 220 may provide the route distribution instructions to proxy network device 240. In some implementations, route management platform may provide route copy instructions to one or more network devices 250.

In some implementations, as shown, route management platform 220 may be hosted in cloud computing environment 230. Notably, while implementations described herein describe route management platform 220 as being hosted in cloud computing environment 230, in some implementations, route management platform 220 might not be cloud-based (i.e., may be implemented outside of a cloud computing environment) or might be partially cloud-based.

Cloud computing environment 230 includes an environment that hosts route management platform 220. Cloud computing environment 230 may provide computation, software, data access, storage, and/or other services that do not require end-user knowledge of a physical location and configuration of system(s) and/or device(s) that host route management platform 220. As shown, cloud computing environment 230 may include a group of computing resource 225 (referred to collectively as "computing resources 225 and individually as "computing resource 225").

Computing resource 225 includes one or more personal computers, workstation computers, server devices, or another type of computation and/or communication device. In some implementations, computing resource 225 may host route management platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with route management platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Proxy network device 240 includes one or more devices capable of receiving, storing, generating, processing, and/or providing information associated with one or more sets of routes. For example, proxy network device 240 may include a router, such as a label switching router (LSR), a label edge router (LER), an ingress router, an egress router, a provider router (e.g., a provider edge router, a provider core router, etc.), a virtual router, and/or the like. Additionally, or alternatively, proxy network device 240 may include a gateway, a switch, a firewall, a hub, a bridge, a reverse proxy, a server device (e.g., a proxy server, a cloud server, a data center server, etc.), a load balancer, and/or a similar device. In some implementations, proxy network device 240 may be a physical device implemented within a housing, such as a chassis. In some implementations, proxy network device 240 may be a virtual device implemented by one or more computer devices of a cloud computing environment or a data center.

In some implementations, proxy network device 240 may be configured with route reflection capabilities for an individual route reflector. In some implementations, proxy network device 240 may be configured with route reflection capabilities for multiple route reflectors. In some implementations, proxy network device 240 may be configured with virtual route reflection capabilities for an individual virtual route reflector (e.g., that is hosted in a virtual environment). In some implementations, proxy network device 240 may be configured with virtual route reflection capabilities for multiple virtual route reflectors (e.g., that are hosted in one or more virtual environments).

In some implementations, proxy network device 240 may be included with a group of network devices 250 as part of a network. For example, proxy network device 240 may be included with a group of network devices 250 as part of an exchange point (XP), an internet exchange point (IXP), and/or the like.

In some implementations, proxy network device 240 may rely on route management platform 220 to make route distribution decisions. For example, proxy network device 240 may make an application programming interface (API) call to route management platform 220 to request route distribution instructions, which may be used to distribute route information amongst one or more network devices 250. In some implementations, proxy network device 240 may make local route distribution decisions with or without the assistance of route management platform 220.

In some implementations, proxy network device 240 may rely on route management platform 220 to make route copy decisions. For example, route management platform 220 may be configured to determine route copy instructions (without a request from proxy network device 240), and may provide the route copy instructions to the one or more network devices 250. In some implementations, proxy network device 240 may make internal route copy decisions. For example, proxy network device 240 may determine route copy instructions locally, and may provide the route copy instructions to the one or more network devices 250.

Network device 250 includes one or more devices capable of receiving, storing, generating, processing, and/or providing information associated with one or more sets of routes. For example, network device 250 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 250 may include a gateway, a switch, a firewall, a hub, a bridge, a reverse proxy, a server device (e.g., a proxy server, a cloud server, a data center server, etc.), a load balancer, and/or a similar device. In some implementations, network device 250 may be a physical device implemented within a housing, such as a chassis. In some implementations, network device 250 may be a virtual device implemented by one or more computer devices of a cloud computing environment or a data center.

In some implementations, network device 250 may be configured with route reflection capabilities. In some implementations, network device 250 may be configured with route reflection capabilities for multiple route reflectors. In some implementations, network device 250 may be configured with virtual route reflection capabilities (e.g., that is hosted in a virtual environment). In some implementations, network device 250 may be configured with virtual route reflection capabilities for multiple virtual route reflectors (e.g., that are hosted in one or more virtual environments).

In some implementations, a group of network devices 250 may be used in conjunction with proxy network device 240 as part of a network (e.g., an exchange point (XP), an internet exchange point (IXP), etc.). In some implementations, a group of network devices may be used as part of a network that does not utilize proxy network device 240. In this case, each client device 210 may need to establish separate associations with each network device 250 (e.g., because there is no longer a proxy network device 240 to serve as a single edge point in the network). Additionally, in this implementation, one or more functions described as being performed by proxy network device 240 may be performed by one or more of the group of network devices 250 (or by another device, such as route management platform 220).

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
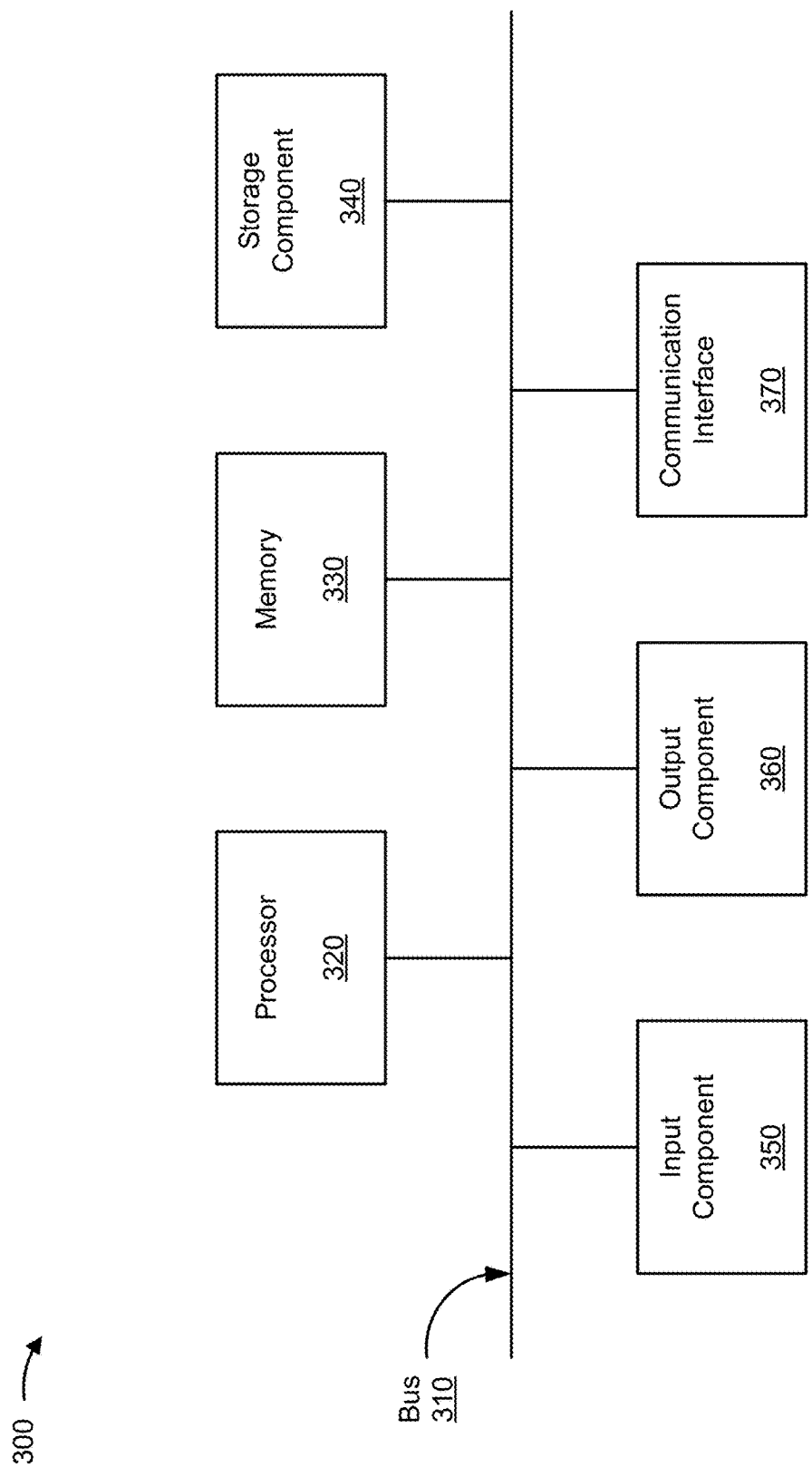
FIG. 3 is a diagram of example components of one or more devices of FIG. 2.

FIG. 3 is a diagram of example components of a device 300. Device 300 may correspond to client device 210, route management platform 220, computing resource 225, proxy network device 240, and/or network device 250. In some implementations, client device 210, route management platform 220, computing resource 225, proxy network device 240, and/or network device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in location of or in combination with software instructions to perform one or more processes described herein. Thus, implementations described herein are not limited to any specific combination of hardware circuitry and software.

In some implementations, one or more components of device 300 may be components of a router, a switch, a hub, or a similar type of device. In this case, the one or more components may include a controller (in place of, or in addition to, processor 320), a switching fabric, one or more packet processing components, one or more links (e.g., an external link, such as a port or a virtual local area network (VLAN), an internal link connecting two elements within device 300, etc.), and/or the like.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
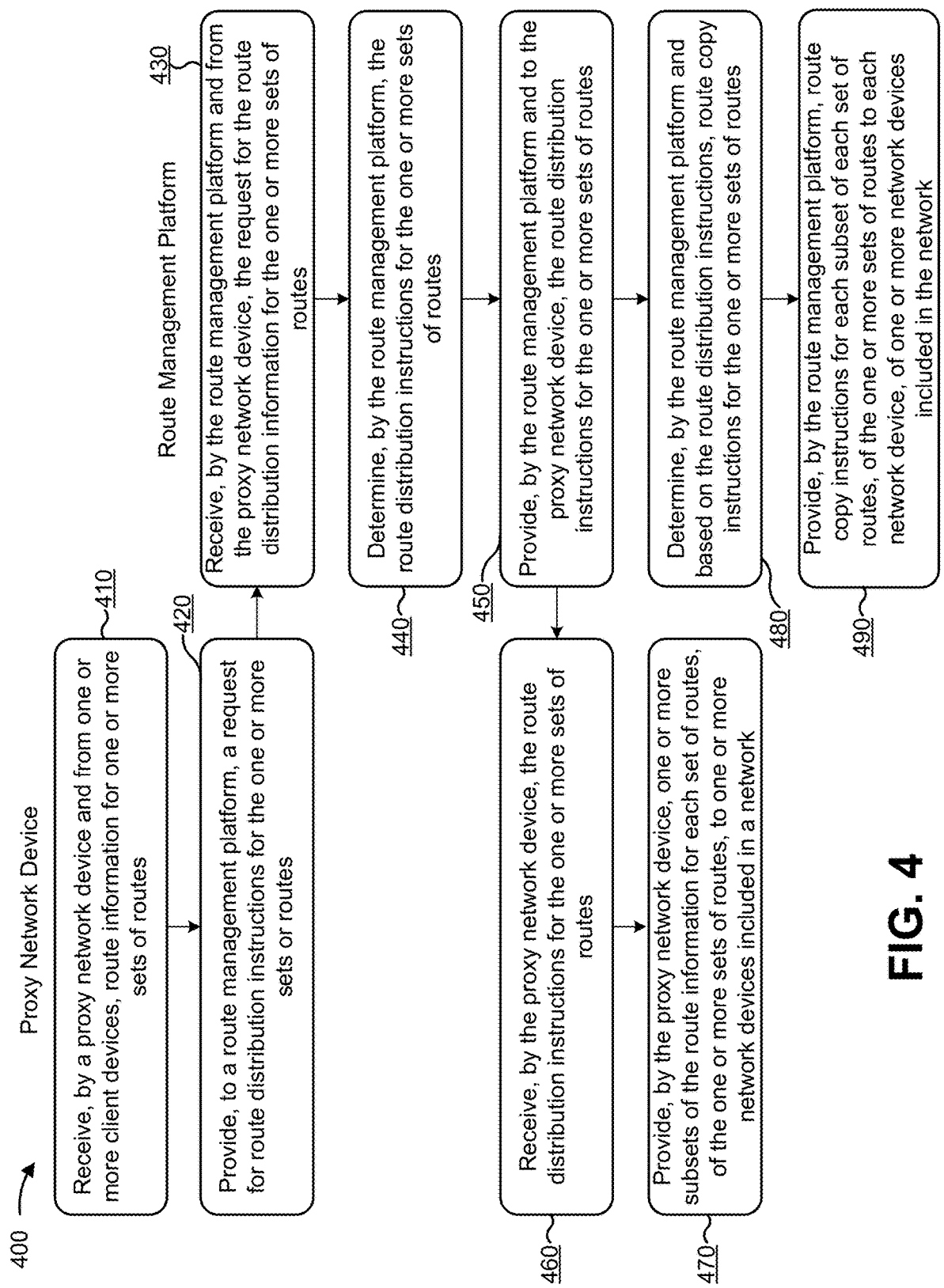
FIG. 4 is a flow chart of an example process for configuring a topology of devices of an exchange point (XP) in a manner that supports scaling.

FIG. 4 is a flow chart of an example process 400 for configuring a topology of devices of an exchange point (XP) in a manner that supports scaling. In some implementations, one or more process blocks of FIG. 4 may be performed by proxy network device 240 and/or route management platform 220. In some implementations, one or more process blocks of FIG. 4 may be performed by another device or a group of devices separate from or including proxy network device 240 and/or route management platform 220, such as client device 210 and/or network device 250.

As shown in FIG. 4, process 400 may include receiving, by a proxy network device and from one or more client devices, route information for one or more sets of routes (block 410). For example, proxy network device 240 (e.g., processor 320, input component 350, a computing resource, a virtual resource, etc.) may receive, from one or more client devices 210, route information for one or more sets of routes.

The route information may include IP address information and/or port information associated with a client device sending traffic, IP address information and/or port information for a device in a same network as client device 210 (e.g., which may be using client device 210 to send traffic through the IXP), IP address information and/or port information for a destination device, IP address information and/or port information for one or more intermediary devices between a starting device and the destination device (e.g., often referred to as a next hop), and/or the like.

In some implementations, proxy network device 240 may be an endpoint in a network, such as an exchange point (XP). For example, proxy network device 240 may be an endpoint that is a point of first contact between client devices 210 and other devices within the network.

In some implementations, one or more devices in the XP may be configured to support route reflection capabilities. For example, proxy network device 240 and/or at least one of the network devices 250 may support route reflection capabilities. The route reflection capabilities may allow a device to distribute route information for the one or more sets of routes amongst other devices in the network. For example, rather than having each client device 210 provide route information to each device in the network, client device 210 may provide route information to a device that supports route reflection capabilities (e.g., proxy network device 240, a network device 250), and the device that supports the route reflection capabilities may ensure that the route information and/or route copy information is distributed amongst other devices in the network, without requiring the other devices in the network to maintain associations with each other.

In some implementations, one or more devices in the XP may be configured to support virtual route reflection capabilities. For example, proxy network device 240 and/or one or more network devices 250 may be configured to support virtual route reflection capabilities. This allows route reflection functions to be carried out on a virtual machine, thereby improving scalability.

In some implementations, proxy network device 240 may receive, from client device 210, route information for a set of routes associated with a particular client. For example, a device of an internet service provider (ISP) may provide route information for a first set of routes (e.g., 10,000 routes) to proxy network device 240. Additionally, a device of a content provider may provide route information for a second set of routes (e.g., 15,000 routes) to proxy network device 240. In this case, proxy network device 240 may be able to intelligently distribute the route information for the two sets of routes amongst the one or more network devices 250, as described further herein.

In some implementations, proxy network device 240 may store route information. For example, proxy network device 240 may store the route information for each client's set of routes using a different data structure. A data structure may be a routing table, a forwarding table, a virtual routing table, a virtual forwarding table, and/or the like. Similarly, other devices in the XP (e.g., the one or more network devices 250) may utilize a similar storage scheme, as described further herein.

In this way, proxy network device 240 is able to receive route information for one or more sets of routes.

As further shown in FIG. 4, process 400 may include providing, to a route management platform, a request for route distribution instructions for the one or more sets of routes (block 420). For example, proxy network device 240 (e.g., processor 320, output component 360, a computing resource, a virtual resource, etc.) may not be configured to make route distribution decisions, and instead, may use an application programming interface (API) to provide, to route management platform 220, a request for route distribution instructions for the one or more sets of routes. The route distribution instructions may indicate an intelligent way to distribute the route information for the one or more sets of routes amongst the one or more network devices 250.

In some implementations, proxy network device 240 may make route distribution decisions. For example, a processor of proxy network device 240 may provide a request for the route distribution instructions to an element supported by proxy network device 240 to cause the element to determine the route distribution instructions and to provide the route distribution instructions to the one or more processors of the proxy network device. An element, as described herein, may be a program that includes a set of instructions that allow proxy network device 240 to be configured with the route distribution instructions, that allow proxy network device 240 to determine route distribution instructions, and/or the like.

In this way, proxy network device 240 is able to provide, to route management platform 220, a request for route distribution instructions for the one or more sets of routes. Furthermore, by using route management platform 220 to make route distribution decisions, proxy network device 240 conserves processing resources, thereby improving the scalability of the XP.

As further shown in FIG. 4, process 400 may include receiving, by the route management platform and from the proxy network device, the request for the route distribution instructions for the one or more sets of routes (block 430). For example, route management platform 220 (e.g., computing resource 225, processor 320, input component 350, etc.) may receive, from proxy network device 240, a request for route distribution instructions for the one or more sets of routes.

In this way, route management platform 220 is able to receive, from proxy network device 240, a request for route distribution instructions for the one or more sets of routes.

As further shown in FIG. 4, process 400 may include determining, by the route management platform, the route distribution instructions for the one or more sets of routes (block 440). For example, route management platform (e.g., computing resource 225, processor 320, etc.) may determine the route distribution instructions by using a set of configurable rules.

The set of configurable rules may include one or more rules indicating an intelligent way to separate the route information for each route, of the one or more sets of routes, into one or more subsets of the route information, one or more rules indicating an intelligent way to distribute the one or more subsets of the route information amongst the network devices (e.g., by indicating which data structures to use to store route information for each subset), and/or the like.

In some implementations, route management platform 220 may use one or more rules to separate the route information for a set of routes into one or more subsets of the route information. For example, route management platform 220 may, based on the one or more rules, separate the set of routes into a number of subsets that is equal to a number of network devices 250 in the XP. As an example, an XP with three network devices 250 would cause route management to separate the route information into three subsets.

In some cases, route management platform 220 may separate the set of routes into equal subsets that are to be distributed amongst the one or more network devices 250. Additionally, or alternatively, route management platform 220 may separate the set of routes into subsets using a rule indicating to load balance distribution of the one or more subsets based on available capacity of each network device 250. Additionally, or alternatively, route management platform 220 may use a rule indicating to distribute the one or more subsets based on location information of the one or more network devices 250. Additionally, or alternatively, route management platform 220 may use a rule indicating to distribute the one or more subsets of the route information based on error reporting information of the one or more network devices 250.

In some implementations, route management platform 220 may separate the route information for a set of routes using IP prefixes. For example, each route may include IP address information (e.g., IP address information for a sender location, for a destination location, etc.), and route management platform 220 may separate route information for the set of routes by separating routes into segments based on a numerical range associated with a prefix of a sender IP address and/or a destination IP address. In this way, route management platform 220 is able to separate route information using IP prefixes.

In some implementations, route management platform 220 may use one or more rules to determine a location of where to store each of the one or more subsets of the route information. For example, route management platform 220 may, based on the one or more rules, determine that each subset, of the one or more subsets of the route information for the set of routes, is to be stored in a client-specific data structure. Additionally, route management platform 220 may determine that each of the one or more subsets of the route information is to be stored in client-specific data structures that are accessible to different network devices 250. In this way, each network device 250, of the one or more network devices 250, may support a data structure that stores a particular subset of the route information for the set of routes.

In some implementations, route management platform 220 may determine the route distribution instructions using a machine learning model. For example, route management platform 220 may train a machine learning model on historical network data, such as historical route information, historical location information for the one or more network devices 250, historical capacity information for the one or more network devices 250, historical error reporting information for the one or more network devices 250, and/or the like.

In this case, route management platform 220 may provide, as input to the machine learning model, the route information for the one or more sets of routes received by the one or more client devices 210, location information for the one or more network devices 250, capacity information for the one or more network devices 250, error reporting information for the one or more network devices 250, and/or the like. This may cause the machine learning model to output instructions for proxy network device 240 on how to separate the route information into one or more subsets of route information and/or how to distribute the one or more subsets of the route information amongst the one or more network devices 250.

In some implementations, route management platform 220 may determine the route distribution instructions based on receiving the request from proxy network device 240. In some implementations, route management platform 220 may be configured with the route distribution instructions. For example, the route distribution instructions for the set of routes may be pre-configured and stored by route management platform 220, such that route management platform 220 does not need to determine the route distribution instructions in real-time (e.g., real-time relative to receiving the request from proxy network device 240).

In some implementations, proxy network device 240 may determine or may be pre-configured with route distribution instructions. For example, rather than request the route distribution instructions, proxy network device 240 may be pre-configured with the route distribution instructions and/or may determine the route distribution using a rule, in a similar manner to that described above.

In this way, route management platform 220 is able to determine the route distribution instructions for the one or more sets of routes. By using route management platform 220 to determine the route distribution instructions, proxy network device 240 conserves processing resources, thereby improving scalability of the XP.

As further shown in FIG. 4, process 400 may include providing, by the route management platform and to the proxy network device, the route distribution instructions for the one or more sets of routes (block 450). For example, route management platform 220 (e.g., computing resource 225, processor 320, output component 360, etc.) may use an API to provide the route distribution instructions to proxy network device 240.

In this way, route management platform 220 is able to provide the route distribution instructions for the one or more sets of routes to proxy network device 240.

As further shown in FIG. 4, process 400 may include receiving, by the proxy network device, the route distribution instructions for the one or more sets of routes (block 460). For example, proxy network device 240 (e.g., processor 320, input component 350, a computing resource, a virtual resource, etc.) may receive, from route management platform 220, the route distribution instructions from route management platform 220.

In this way, proxy network device 240 is able to receive the route distribution instructions for the one or more sets of routes.

As further shown in FIG. 4, process 400 may include providing, by the proxy network device, one or more subsets of the route information for each set of routes, of the one or more sets of routes, to one or more network devices included in a network (block 470). For example, proxy network device 240 (e.g., processor 320, output component 360, a computing resource, a virtual resource, etc.) may use the route distribution instructions to provide, to each network device 250 of the one or more network devices 250 included in the XP, one or more subsets of the route information for each set of routes.

In some implementations, proxy network device 240 may provide a subset of the route information for a set of routes to a network device 250. For example, proxy network device 240 may process the route distribution instructions to identify a subset of the route information that is to be distributed to the network device 250, and may provide the subset of the route information to the network device 250. Additionally, proxy network device 240 may indicate which data structure the network device 250 is to use to store the subset of the route information.

In some implementations, each network device 250, of the one or more network devices 250, may use separate data structures for storing the subsets of the route information. The data structure may be a routing table, a forwarding table, a virtual routing table, a virtual forwarding table, and/or the like. In some cases, a network device 250 may use client-specific data structures, such that each data structure accessible to the network device 250 is associated with a particular client (or a particular client's set of routes). Here, each client-specific data structure may be used to store a subset of the route information for a set of routes. In other cases, a network device 250 may use data structures that are not client-specific, and may be provided with route distribution instructions that use a different a different distribution scheme.

In this way, proxy network device 240 is able to distribute the route information amongst the one or more network devices 250.

As further shown in FIG. 4, process 400 may include determining, by the route management platform and based on the route distribution instructions, route copy instructions for the one or more sets of routes (block 480). For example, route management platform 220 (e.g., computing resource 225, processor 320, etc.) may, after determining the route distribution instructions, determine route copy information for each subset of the route information for each of the one or more sets of routes.

In some implementations, route management platform 220 may determine route copy instructions for a set of routes using one or more configurable rules. The one or more configurable rules may include a rule indicating an intelligent way to determine the number of copies that each network device 250 is to generate, a rule indicating an intelligent way to determine the locations of where to store the copies, and/or the like.

In some implementations, route management platform 220 may be configured with route copy instructions. For example, rather than determine the route copy instructions, route management platform 220 may be configured with copy instructions indicating a number of times that each network device 250, of the one or more network devices 250, is to generate a copy of the one or more subsets of the route information, storage instructions indicating locations of where to store the copies of the one or more subsets of the route information, and/or the like.

Generating route copy information allows each client-specific data structure to include routes for all clients within the XP, thereby preserving transparency. Additionally, route copy information improves stability in the XP (e.g., through redundancies in the storage of the route information).

In some implementations, a different device may determine or be configured with route copy instructions. For example, proxy network device 240 and/or the one or more network devices 250 may determine or be configured with route copy instructions, in a similar manner to that described above.

In some implementations, route management platform 220 may determine the route copy instructions based on a trigger. For example, as soon as route management platform 220 determines the route distribution instructions, route management platform 220 may be configured to determine the route copy information. In some implementations, route management platform 220 may determine the route copy information based on a different trigger, such as receiving a request from proxy network device 240, a timer, a preconfigured rule or setting, and/or the like.

In this way, route management platform 220 is able to determine the route copy instructions. By using route management platform 220 to determine route copy instructions, proxy network device 240 conserves processing resources, thereby improving scalability of the XP.

As further shown in FIG. 4, process 400 may include providing, by the route management platform, the route copy instructions to the one or more network devices included in the network (block 490). For example, route management platform 220 (e.g., computing resource 225, processor 320, output component 360, etc.) may provide the route copy instructions to the one or more network devices 250 to allow the one or more network devices 250 to generate and store route copy information.

In some implementations, a network device 250 may generate route copy information for a subset of the route information for a set of routes. For example, the network device 250 may use the route copy instructions to generate a particular number of copies of a particular subset of the route information. In some cases, the network device 250 may generate copies such that every client-specific data structure supported by the network device 250 stores either the subset of the route information or route copy information for the subset of the route information. Stated differently, the network device 250 may generate route copy information for the subset of the route information such that every client-specific data structure except for one stores the route copy information (because one of the data structures will store the original subset of the route information).

In some implementations, the network device 250 may store the route copy information for the subset of the route information using one or more data structures. For example, the network device 250 may store the route copy information using every data structure associated with the network device 250 except a data structure that is used to store the original subset of the route information. In this way, every client-specific data structure may store either the original subset of the route information or a copy of the subset of the route information (referred to herein as route copy information). This preserves transparency by allowing each client to have access to routes for all clients included in the XP.

In some implementations, after the route information and the route copy information is stored using the one or more data structures, the one or more network devices 250 may be able to make best-fit route determinations to each destination. For example, if several clients offered routes to a particular destination, the one or more network devices 250 may be able to make a best-fit route destination for each client, and may update client-specific data structures to identify the best-fit routes. In other cases, a different device may make best-fit route determinations, such as proxy network device 240, route management platform 220, and/or a similar type of device. By distributing best-fit route determinations amongst the one or more network devices 250, processing resources that are needed to determine best-fit routes are load balanced and distributed amongst devices in the IXP, thereby improving scalability of the IXP (e.g., by reducing a number of best-fit route determinations that proxy network device 240 might otherwise have to make).

In this way, the route management platform 220 is able to provide the route copy instructions to each network device 250, of the one or more network devices 250 included in the network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the architectural approach allows the XP to scale to support additional clients and/or additional traffic per client. For example, by distributing route information and route copy information for each set of routes amongst the one or more network devices, each network device 250 avoids having to store all route information and/or all route copy information for all sets of routes. This reduces a utilization of memory resources on each network device 250 thereby improving scalability. Additionally, the architectural approach reduces a utilization of network resources and/or processing resources of proxy network device 240 by reducing a total amount of route information that proxy network device 240 distributes amongst the one or more network devices 250, and by eliminating a need for proxy network device 240 to distribute route copy instructions entirely (e.g., by use of route management platform 220), thereby improving scalability.

Additionally, the architectural approach reduces an amount of time needed to distribute the route information and/or the route copy information, thereby improving scalability by improving a speed at which a device in the XP is able to perform best-fit route determinations. Furthermore, the architectural approach allows the XP to scale while preserving transparency and not violating client-specific routing policies.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
    determining, by one or more devices, a number of copies of one or more subsets of route information that a network device, of one or more network devices, is to generate,
        the number of copies being determined based on a rule that indicates to generate copies of a subset, of the one or more subsets of the route information, that is provided to the network device;
    determining, by the one or more devices and for the one or more subsets of the route information, route copy instructions that indicate the number of copies of the one or more subsets of the route information that the network device is to generate; and
    providing, by the one or more devices and to the one or more network devices, the route copy instructions to cause the one or more network devices to generate route copy information for the one or more subsets of the route information.

2. The method of claim 1, wherein the route copy instructions further indicate locations of where to store copies of the one or more subsets of the route information.

3. The method of claim 1, wherein the number of copies is a number that allows every data structure associated with the network device to store either the subset or route copy information for the subset.

4. The method of claim 1, wherein the one or more network devices are in an internet exchange point (IXP).

5. The method of claim 1, further comprising:
    determining route distribution instructions for one or more sets of routes; and
    providing the route distribution instructions to a proxy network device.

6. The method of claim 1, wherein the route copy instructions are determined after route distribution instructions are determined.

7. A system, comprising:
    one or more memories; and
    one or more processors, communicatively coupled to the one or more memories, configured to:
        determine a number of copies of one or more subsets of route information that a network device, of one or more network devices, is to generate,
            the number of copies being determined based on a rule that indicates to generate copies of a subset, of the one or more subsets of the route information, that is provided to the network device;

determine, for the one or more subsets of the route information, route copy instructions that indicate the number of copies of the one or more subsets of the route information that the network device is to generate; and provide, to the one or more network devices, the route copy instructions to cause the one or more network devices to generate route copy information for the one or more subsets of the route information.

8. The system of claim 7, wherein the route copy instructions further indicate locations of where to store copies of the one or more subsets of the route information.

9. The system of claim 7, wherein the number of copies is a number that allows every data structure associated with the network device to store either the subset or route copy information for the subset.

10. The system of claim 7, wherein the one or more network devices are in an internet exchange point (IXP).

11. The system of claim 7, wherein the one or more processors are further configured to:
determine route distribution instructions for one or more sets of routes; and
provide the route distribution instructions to a proxy network device.

12. The system of claim 7, wherein the route copy instructions are determined after route distribution instructions are determined.

13. A non-transitory computer-readable medium storing instructions, the instructions comprising:
one or more instructions that, when executed by one or more processors, cause the one or more processors to:
determine a number of copies of one or more subsets of route information that a network device, of one or more network devices, is to generate,
the number of copies being determined based on a rule that indicates to generate copies of a subset, of the one or more subsets of the route information, that is provided to the network device;
determine, for the one or more subsets of the route information, route copy instructions that indicate the number of copies of the one or more subsets of the route information that the network device is to generate; and
provide, to the one or more network devices, the route copy instructions to cause the one or more network devices to generate route copy information for the one or more subsets of the route information.

14. The non-transitory computer-readable medium of claim 13, wherein the route copy instructions further indicate locations of where to store copies of the one or more subsets of the route information.

15. The non-transitory computer-readable medium of claim 13, wherein the number of copies is a number that allows every data structure associated with the network device to store the subset.

16. The non-transitory computer-readable medium of claim 13, wherein the one or more network devices are in an internet exchange point (IXP).

17. The non-transitory computer-readable medium of claim 13, wherein the one or more instructions, when executed by the one or more processors, further cause the one or more processors to:
determine route distribution instructions for one or more sets of routes; and
provide the route distribution instructions to a particular device.

18. The non-transitory computer-readable medium of claim 17, wherein the particular device is a proxy network device.

19. The non-transitory computer-readable medium of claim 17, wherein the route copy instructions are determined after the route distribution instructions are determined.

20. The non-transitory computer-readable medium of claim 13, wherein the number of copies is a number that allows every data structure associated with the network device to store route copy information for the subset.

* * * * *